(12) United States Patent
Harvill

(10) Patent No.: US 10,969,743 B2
(45) Date of Patent: Apr. 6, 2021

(54) SYSTEM AND METHOD FOR THE EFFICIENT RECORDING OF LARGE APERTURE WAVE FRONTS OF VISIBLE AND NEAR VISIBLE LIGHT

(71) Applicant: Zazzle Inc., Redwood City, CA (US)

(72) Inventor: Young Harvill, Half Moon Bay, CA (US)

(73) Assignee: Zazzle Inc., Redwood City, CA (US)

( * ) Notice: Subject to any disclaimer, the term of this patent is extended or adjusted under 35 U.S.C. 154(b) by 941 days.

(21) Appl. No.: 13/724,589

(22) Filed: Dec. 21, 2012

(65) Prior Publication Data

US 2013/0208329 A1 Aug. 15, 2013

Related U.S. Application Data

(60) Provisional application No. 61/581,389, filed on Dec. 29, 2011.

(51) Int. Cl.
| | |
|---|---|
| *G03H 1/30* | (2006.01) |
| *G03H 1/22* | (2006.01) |
| *G02B 5/32* | (2006.01) |
| *G03H 1/02* | (2006.01) |

(52) U.S. Cl.
CPC .............. *G03H 1/2202* (2013.01); *G02B 5/32* (2013.01); *G03H 1/30* (2013.01); *G03H 1/0244* (2013.01); *G03H 1/0248* (2013.01); *G03H 1/22* (2013.01)

(58) Field of Classification Search
CPC ...... G03H 1/2202; G03H 1/30; G03H 1/0248; G03H 1/22; G03H 1/0244; G02B 5/32
USPC ...................................................... 359/22, 25
See application file for complete search history.

(56) References Cited

U.S. PATENT DOCUMENTS

| | | | |
|---|---|---|---|
| 3,623,798 | A * | 11/1971 | Sheridon .................. G03H 1/18 359/8 |
| 4,636,027 | A | 1/1987 | Dube |
| 4,888,260 | A | 12/1989 | Cowan |
| 5,134,669 | A | 7/1992 | Keogh et al. |
| 5,343,401 | A | 8/1994 | Goldberg et al. |
| 5,422,819 | A | 6/1995 | Nakamura |
| 5,615,318 | A | 3/1997 | Matsuura |
| 5,850,222 | A | 12/1998 | Cone |
| 5,872,555 | A | 2/1999 | Kolar et al. |

(Continued)

FOREIGN PATENT DOCUMENTS

| | | |
|---|---|---|
| CN | 1536511 A | 10/2004 |
| CN | 1713196 A | 12/2005 |

(Continued)

OTHER PUBLICATIONS

Wu et al (Wavelength-multiplexed submicron holograms for disk-compatible data storage, Optics Express, vol. 15, No. 26, Dec. 24, 2007, pp. 17798-17804).*

(Continued)

*Primary Examiner* — Stephone B Allen
*Assistant Examiner* — Jyotsna V Dabbi
(74) *Attorney, Agent, or Firm* — DLA Piper LLP

(57) ABSTRACT

A hybrid system and method for recording wave fronts of light. This system combines elements of two imaging systems, Holography and Integral imaging, to produce an imaging system that has higher efficiency and better resolution than Integral imaging, and few of the limitations of holographic recording.

25 Claims, 11 Drawing Sheets

(56) References Cited

U.S. PATENT DOCUMENTS

| | | |
|---|---|---|
| 6,012,402 A | 1/2000 | Sekine |
| 6,012,890 A | 1/2000 | Celorio Garrido |
| 6,029,141 A | 2/2000 | Bezos et al. |
| 6,097,310 A | 8/2000 | Harrell et al. |
| 6,173,211 B1 | 1/2001 | Williams et al. |
| 6,321,670 B1 | 1/2001 | Tomita et al. |
| 6,196,146 B1 | 3/2001 | Goldberg et al. |
| 6,280,891 B2 | 8/2001 | Daniel |
| 6,310,627 B1 | 10/2001 | Sakaguchi |
| 6,392,748 B1 | 5/2002 | Fateley |
| 6,473,671 B1 | 10/2002 | Yan |
| 6,513,921 B1 | 2/2003 | Houle |
| 6,513,924 B1 | 2/2003 | Goldberg et al. |
| 6,546,309 B1 | 4/2003 | Gazzuolo |
| 6,564,118 B1 | 5/2003 | Swab |
| 6,804,573 B2 | 10/2004 | Goldman |
| 6,804,660 B2 | 10/2004 | Landau et al. |
| 6,842,532 B2 | 1/2005 | Hu et al. |
| 6,859,679 B1 | 2/2005 | Smith |
| 6,907,310 B2 | 6/2005 | Gardner et al. |
| 6,947,808 B2 | 9/2005 | Goldman |
| 6,968,075 B1 | 11/2005 | Chang |
| 6,994,201 B2 | 2/2006 | Yu et al. |
| 7,016,756 B2 | 3/2006 | Goldman |
| 7,016,757 B2 | 3/2006 | Goldman |
| 7,054,709 B2 | 5/2006 | Takeuchi |
| 7,216,092 B1 | 5/2007 | Weber et al. |
| 7,340,416 B1 | 3/2008 | Larabee |
| 7,409,259 B2 | 8/2008 | Reyes Moreno |
| 7,479,956 B2 | 1/2009 | Shaw-Weeks |
| 7,616,851 B1 | 11/2009 | Uhlhorn et al. |
| 8,069,091 B1 | 11/2011 | Callen et al. |
| 8,090,461 B2 | 1/2012 | Harvill et al. |
| 8,174,521 B2 | 5/2012 | Harvill et al. |
| 8,175,931 B2 | 5/2012 | Harvill et al. |
| 8,240,262 B2 | 8/2012 | Zeiger et al. |
| 8,249,738 B2 | 8/2012 | Lastra et al. |
| 8,401,916 B2 | 3/2013 | Harvill et al. |
| 8,411,090 B2 | 4/2013 | Wang |
| 8,514,220 B2 | 8/2013 | Harvill et al. |
| 8,516,392 B2 | 8/2013 | Ostroff |
| 8,654,120 B2 | 2/2014 | Beaver et al. |
| 8,711,175 B2 | 4/2014 | Aarabi |
| 8,712,566 B1 | 4/2014 | Harvill |
| 8,878,850 B2 | 11/2014 | Harvill et al. |
| 8,958,633 B2 | 2/2015 | Harvill |
| 9,087,355 B2 | 7/2015 | Harvill et al. |
| 9,213,920 B2 | 12/2015 | Harvill et al. |
| 9,477,979 B2 | 10/2016 | Harvill et al. |
| 2001/0026272 A1 | 10/2001 | Feid et al. |
| 2002/0007228 A1 | 1/2002 | Goldman |
| 2002/0030689 A1 | 3/2002 | Eichel et al. |
| 2002/0082960 A1 | 6/2002 | Goedken |
| 2002/0099524 A1 | 7/2002 | Sell et al. |
| 2003/0023687 A1 | 1/2003 | Wolfe |
| 2003/0076318 A1 | 4/2003 | Shaw-Weeks |
| 2003/0120183 A1 | 6/2003 | Simmons |
| 2003/0168148 A1 | 9/2003 | Gerber et al. |
| 2003/0177364 A1 | 9/2003 | Walsh et al. |
| 2003/0179197 A1 | 9/2003 | Sloan et al. |
| 2003/0182402 A1 | 9/2003 | Goodman et al. |
| 2003/0184544 A1 | 10/2003 | Prudent |
| 2003/0229893 A1 | 12/2003 | Sgaraglino |
| 2004/0024764 A1 | 2/2004 | Hsu et al. |
| 2004/0044566 A1 | 3/2004 | Bostelmann et al. |
| 2004/0049309 A1 | 3/2004 | Gardner et al. |
| 2004/0078285 A1 | 4/2004 | Bijvoet |
| 2004/0078294 A1 | 4/2004 | Rollins et al. |
| 2004/0095375 A1 | 5/2004 | Burmester et al. |
| 2004/0153512 A1 | 8/2004 | Friend |
| 2004/0194344 A1 | 10/2004 | Tadin |
| 2004/0227752 A1 | 11/2004 | McCartha et al. |
| 2004/0236455 A1 | 11/2004 | Woltman et al. |
| 2004/0236634 A1 | 11/2004 | Ruuttu |
| 2004/0267610 A1 | 12/2004 | Gossett et al. |
| 2005/0065799 A1 | 3/2005 | Dare et al. |
| 2005/0071242 A1 | 3/2005 | Allen et al. |
| 2005/0125092 A1 | 6/2005 | Lukis et al. |
| 2005/0131571 A1 | 6/2005 | Costin |
| 2005/0144090 A1 | 6/2005 | Gadamsetty |
| 2005/0149223 A1 | 7/2005 | Takeuchi |
| 2005/0155316 A1 | 7/2005 | Shipley |
| 2005/0177453 A1 | 8/2005 | Anton et al. |
| 2005/0182707 A1 | 8/2005 | Yeager |
| 2005/0203766 A1 | 9/2005 | Donaldson |
| 2005/0204002 A1 | 9/2005 | Friend |
| 2005/0238251 A1 | 10/2005 | Lunetta et al. |
| 2005/0251462 A1 | 11/2005 | Nykamp |
| 2006/0015207 A1 | 1/2006 | Weiser et al. |
| 2006/0020486 A1 | 1/2006 | Kurzweil et al. |
| 2006/0027154 A1 | 2/2006 | Naka et al. |
| 2006/0156283 A1 | 7/2006 | Landau et al. |
| 2006/0178952 A1 | 8/2006 | Harris |
| 2006/0226563 A1 | 10/2006 | Albert et al. |
| 2007/0005461 A1 | 1/2007 | Lenz |
| 2007/0083383 A1 | 4/2007 | Van Bael et al. |
| 2007/0174132 A1 | 7/2007 | Shemula |
| 2007/0208633 A1 | 9/2007 | Singh |
| 2008/0006192 A1 | 1/2008 | Zeiger et al. |
| 2008/0079727 A1 | 4/2008 | Goldman et al. |
| 2008/0092309 A1 | 4/2008 | Ellis et al. |
| 2008/0147512 A1 | 6/2008 | Yankton |
| 2008/0147219 A1 | 8/2008 | Jones |
| 2009/0070666 A1 | 3/2009 | Eilers et al. |
| 2009/0109214 A1 | 4/2009 | Harvill et al. |
| 2009/0122329 A1 | 5/2009 | Hegemier et al. |
| 2009/0182573 A1 | 7/2009 | Lidestri |
| 2009/0190858 A1 | 7/2009 | Moody et al. |
| 2009/0222127 A1 | 9/2009 | Lind |
| 2009/0254207 A1 | 10/2009 | Tiffany et al. |
| 2010/0042484 A1 | 2/2010 | Sipes |
| 2010/0119957 A1 | 5/2010 | Satou et al. |
| 2010/0169185 A1 | 7/2010 | Cottingham |
| 2010/0185309 A1 | 7/2010 | Ohiaeri et al. |

FOREIGN PATENT DOCUMENTS

| | | |
|---|---|---|
| CN | 1828671 | 9/2006 |
| CN | 1877629 | 12/2006 |
| CN | 102203818 | 3/2010 |
| CN | 101663662 A | 9/2011 |
| EP | 1136899 | 9/2001 |
| JP | S61-255376 | 11/1986 |
| JP | H07-140886 | 6/1995 |
| JP | 10-222653 A | 8/1998 |
| JP | 10-247256 A | 9/1998 |
| JP | 11-066119 A | 3/1999 |
| JP | 2001-052177 | 2/2001 |
| JP | 2001-314677 | 11/2001 |
| JP | 2002-133201 | 5/2002 |
| JP | 2003-122960 A | 4/2003 |
| JP | 2004-152000 A | 5/2004 |
| JP | 2005-118215 | 5/2005 |
| JP | 2007-183486 | 7/2007 |
| JP | 2011-077764 | 4/2011 |
| KR | H02-104758 | 4/1990 |
| WO | WO 2001/087001 | 11/2001 |
| WO | WO 2002/12925 | 2/2002 |
| WO | WO 2003/085186 | 10/2003 |
| WO | WO 2008/038039 | 4/2008 |
| WO | WO 2010/022404 | 2/2010 |
| WO | WO 2012/067230 | 5/2012 |

OTHER PUBLICATIONS

PCT International Preliminary Report on Patentability of PCT/US12/71589 dated Dec. 2, 2014; (7 pgs.).

PCT International Search Report of PCT/US12/71589; dated Mar. 4, 2013 (2 pgs.).

PCT Written Opinion of PCT/US12/71589; dated Mar. 4, 2013 (6 pgs.).

(56) References Cited

OTHER PUBLICATIONS

Demarco "Zazzle and Pitney Bowes Team up to deliver custom stamps to consumers," (2005), published online: http//www.zazzle.com/mk/welcome/pressreleases/pr071805_2 (2 pages).

Joele: "Research Assignment of an Augmented Reality System using ARToolKit and user invisible markers," 2005 (Jan. 1, 2005), XP055103237, Retrieved from the Internet: URL:http://graphics.tudelft.nl/~vrphobia/RA_final_report_Dennis_Joele.pdf [retrieved on Feb. 19, 2014] (66 pgs.).

Ehara J et al: "Texture overlay for virtual clothing based on PCA of silhouettes" Mixed and Augmented Reality, 2006. ISMAR 2006. IEEE/ACM International Symposium on, IEEE, PI, Oct. 1, 2006 (Oct. 1, 2006), pp. 139-142, XP031014661 ISBN: 978-1-4244-0650-0 (4 pages).

Ehara J et al: "Texture overlay onto deformable surface for virtual clothing" ACM International Conference Proceeding Series—Proceedings of the 2005 International Conference on Augmented Tele-Existence, ICAT '05 2005 Association for Computing Machinery USA, vol. 157, 2005, pp. 172-179, XP002606672 DO!: DOI:10.1145/1152399.1152431 (8 pages).

Gruber, "Texture Mapping," Ted Gruber Software, Inc., pp. 1-2 (2001) (2 pgs.).

Heckbert, Paul S. "Fundamentals of texture mapping and image warping" Master's Thesis under the direction of Carlo Sequin, Dept. of Electrical Engineering and Computer Science University of California, Berkeley. Jun. 17, 1989.

Meseth "Towards Predictive Rendering in Virtual Reality" Ph.D. dissertation, Bonn University, published Oct. 2006 (369 pages).

Nelson, J "From Moon Shoes to Gel Gun—Sustaining Hart health", Columbian. Vancouver, Wash.: Oct. 11, 2007 (3 pages).

Real Studio, "Real 3D Tutorials: Tutorial 5—Texture Mapping," pp. 1-5 (printed Sep. 9, 2016) (5 pgs.).

Scholz V et al: "Garment motion capture using color-coded patterns" Computer Graphics Forum Blackwell Publishers for Eurographics Assoc UK, vol. 24, No. 3, 2005, pp. 439-439, XP002603022 ISSN: 0167-7055 (9 pages).

Wolfe, "Teaching Texture Mapping Visually," Nov. 1997, pp. 1-37 (37 pgs.).

\* cited by examiner

SYSTEM AND METHOD FOR THE EFFICIENT RECORDING OF LARGE APERTURE WAVE FRONTS OF VISIBLE AND NEAR VISIBLE LIGHT

PRIORITY CLAIM/RELATED APPLICATIONS

This application claims the benefit of and priority under 35 USC 119(e) and 120 to U.S. Provisional Patent Application Ser. No. 61/581,389, filed on Dec. 29, 2011 and entitled "System and Method for the Efficient Recording of Large Aperture Wave Fronts of Visible and Near Visible Light", the entirety of which is incorporated herein by reference.

FIELD

The disclosure relates generally to an imaging system and method and in particular to a system and method for recording wave fronts of light using holography and integral imaging.

BACKGROUND

There are many approaches to recording wave fronts of light. These approaches can be arbitrarily divided into three classes of recording:

1. Approaches that record the amplitude of a real image on a recording medium, the real image being produced by an optical system. Typically, these processes are called photography.

2. Approaches that record the phase of the wave front of light by recording the amplitude of an interference pattern on a recording medium produced by a signal wave front and a reference wave front. Typically, these processes are called holography.

3. Approaches that record the phase of a wave front of light through the simultaneous recording of light amplitude on a recording medium of a large number of points of view. These processes are often known as integral imaging.

Each of the above approaches has advantages and limitations.

For example, photography produces an image that is easily processed and understood, but is limited to a single point of view and a single focal plane. Technologies for recording photographs are well understood, are widely used, and its recording and computational components have benefited from cost efficiencies from mass production. Unfortunately, photography has poor efficiency in the use of the energy of the input wave front of light. This is due to the fact that the photography process must filter the light spatially using a small aperture for optimal depth of field, and by frequency, to record color. The use of a small aperture also limits the amount of information a photograph may capture due to the diffraction limits of an optical system using a small aperture.

Holography produces an image that is a full recreation of the wave front of light over the aperture of the recording media, with no limitations on viewpoint or focal plane. Holography is very efficient in its use of the energy of the input wave front of light. The entire incident light from the two wave fronts is recorded. Holograms are recorded using interference, which is matched to the diffraction limits of the wave fronts recorded. Since the recording aperture is the entire recording area, holograms approach the theoretical information and resolution limits of recording visual information. Unfortunately, there are severe constraints limiting when a hologram may be recorded that makes them impractical as a general approach to recording a wide variety of imagery. For example, holograms may only be recorded using light that has spatial and frequency coherence.

Integral imaging can record multiple points of view, and through use of additional computation, is free of focal plane constraints. The use of classic optical systems in integral imaging imposes the same efficiency and information limits as photography, with the additional resource burden of imaging many points of view, often on a single recording device or surface.

Thus, it is desirable to provide an imaging system and method that overcomes the above limitations with the known approaches and it is to this end that the disclosure is directed.

DETAILED DESCRIPTION OF ONE OR MORE EMBODIMENTS

The disclosure is particularly applicable to the hybrid integral imaging system and method described below that efficiently records large aperture wave fronts of visible and near visible light and it is in this context that the disclosure will be described. It will be appreciated, however, that the system and method has greater utility. For example, the embodiment described below may be used for visible light, but the hybrid integral imaging system and method may also be used with non-visible light. More generally, the hybrid integral imaging system and method may be used with various types of electromagnetic radiation.

In one implementation, the system and method may be used with electromagnetic radiation that has line spectra that fall within a Visible region and a Near infrared (IR) region of the electromagnetic spectrum. For example, the line spectra (with a range of wavelengths) may include one or more of violet at 380-450 nm, blue at 450-495 nm, green at 495-570 nm, yellow at 570-590 nm, orange at 590-620 nm, red at 620-750 nm and near it at 2,500 to 750 nm.

Figure 1:
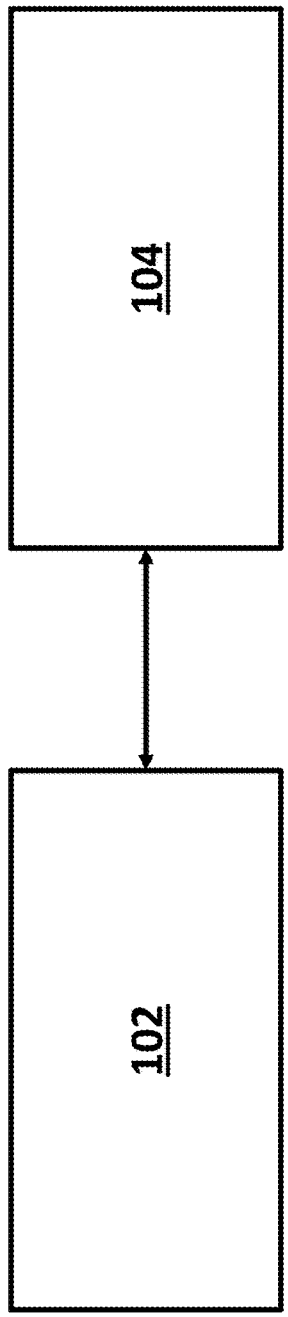
FIGS. 1 and 2 are each an example of an implementation of a hybrid integral imaging system.
Figure 2:
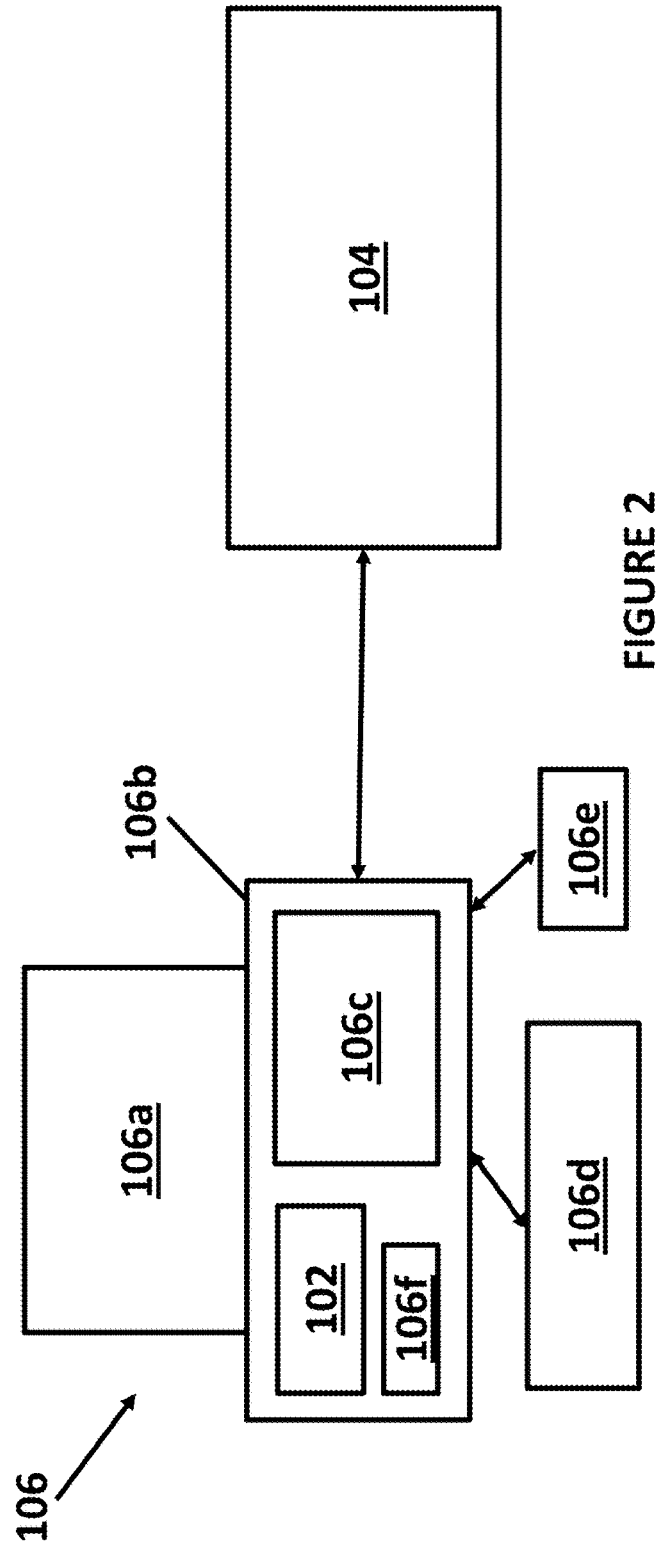

FIGS. 1 and 2 are each an example of an implementation of a hybrid integral imaging system 100. In FIG. 1, the system may comprise a processing module 102 that is coupled to a hybrid integral imaging unit 104. The processing module 102 may be any typical microprocessor, microcontroller, state machine and the like that is able to process the data that is generated by the hybrid integral imaging unit 104 as described below in more detail. In some embodiments, the processing module 102 and the hybrid integral imaging unit 104 may be both housed in a single enclosure. In the example in FIG. 1, the processing module 102 may include storage that allows the data from the hybrid integral imaging unit 104 to be stored and processed. In FIG. 2, the processing module 102 may be a computer system 106 or part of the computer system. The computer system may be a personal computer, a server computer, a cloud computing resource, a laptop computer, a smartphone device and the like. In the example in FIG. 2, the computer system is a desktop computer system that may have a display 106a, a chassis 106b (that may house the processing unit 102 and a memory or persistent storage unit 106c) and one or more input/output devices, such as a keyboard 106d and a mouse 106e, that allow a user to interact with the computer system. The computer system may also have an interface and circuits 106f that allows the processing unit 102 to communicate, wirelessly or in a wired manner, to a remote device. As shown in FIG. 2, the hybrid integral imaging unit 104 may be coupled to the computer system.

In addition to the implementation of the processing module 102 shown in FIGS. 1-2, the processing module may contain a set of individual microprocessor elements with each microprocessor element being mapped to a region of the image recording element as an input. Each microprocessor element also may be mapped to many portions of memory representing a portion of the processed image as an output in a manner that allows parallel computation of the multiplexed input into a portion of the requested view. Alternatively, the processing module 102 may contain a set of individual microprocessor elements with each microprocessor element being mapped to several regions of the image recording element or an associated processor, as an input, and to a single portion of the requested view as an output, in a manner that allows parallel computation of the multiplexed input into a portion of the requested view. The details of the processing unit 102 and the hybrid integral imaging unit 104 are provided below.

Figure 3A:
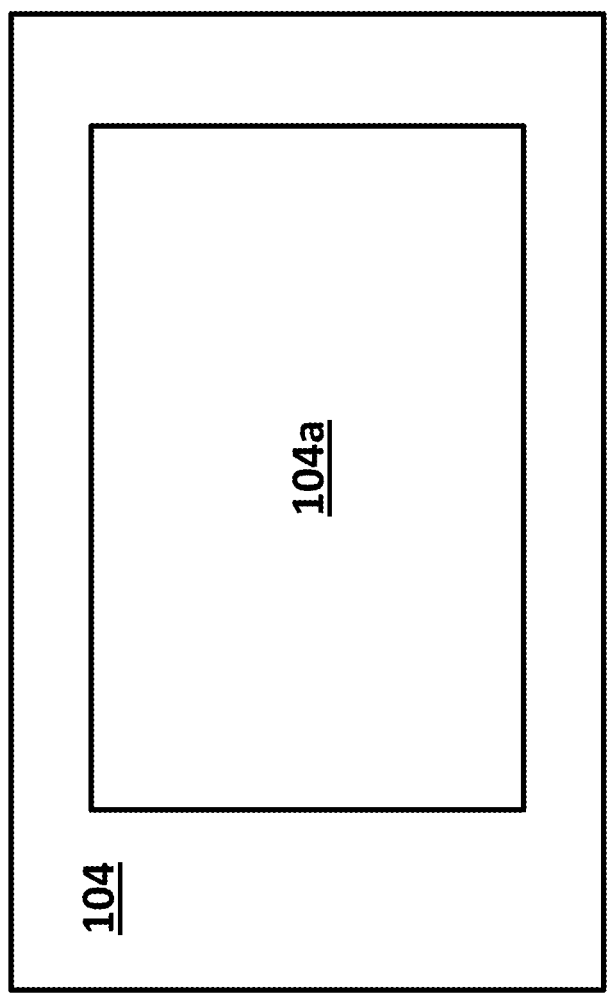
FIGS. 3A-3D illustrate more details of a hybrid integral imaging system.
Figure 3B:
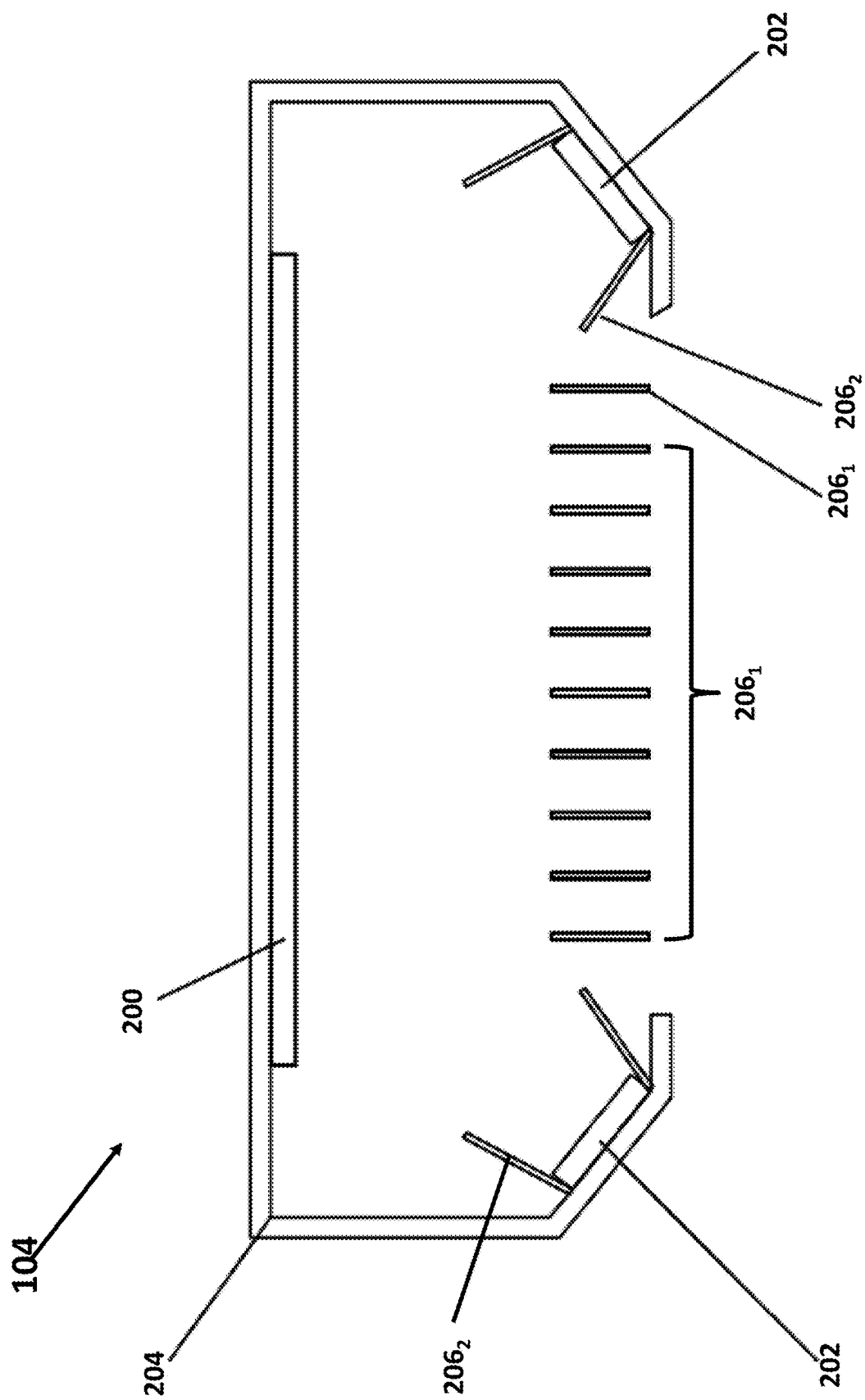

FIGS. 3A and 3B illustrates more details of a hybrid integral imaging unit 104. As shown in FIG. 3A, the hybrid integral imaging unit 104 may include an enclosure 104A that houses the other components on the unit shown in FIG. 3B. The hybrid integral imaging has the cost advantages of photography and integral imaging, and removes many of their constraints by replacing the standard optical system of photography, or of integral light field imaging with a holographic multiplexing element 200 that is shown in FIG. 3B and described below in more detail.

The holographic multiplexing element 200 provides efficient multiplexing of information in the input light wave front to individual recording devices. More particularly, the holographic multiplexing element 200 may efficiently multiplex the wave front into discrete channels for Color, Viewpoint, and Depth.

The hybrid integral imaging unit 104 may be composed of five components including the holographic multiplexing element 200, one or more image recording elements 202, a support component 204, one or more light ways 206 that are shown in FIG. 3. The hybrid integral imaging unit 104 may further comprise the processing module 102 shown in FIGS. 1-2, a user interface module, such as the display 106a in FIG. 2 and other portions of the processing module, and the enclosure 104A shown in FIG. 3A.

A. Holographic Multiplexing Element 200

The holographic multiplexing element 200 may be a volume reflection hologram recorded in the Lipmann-Bragg regime. This type of hologram contains recorded interference fringes slicing through a volume of the recording medium at ½ wavelength layers. This geometry reflects and filters light of a specific wavelength. Recording materials are available that are very efficient in reconstruction, so it is possible to record in this hologram many virtual off-axis concave parabolic (or spheroid) focusing sub-elements, such as mirrors, that efficiently reflect and focus a narrow wavelength of light. Each virtual mirror sub-element may be designed to focus an image of a particular frequency band from a specific point of view, with a specific virtual aperture, and a specific depth of field to an individual recording element. The sub-elements may also be mapped to portions of an image recording element. Alternatively, each focusing sub-element may be paired with an image recording element.

In one implementation, the holographic multiplexing element 200 may be implemented as a set of discrete volume reflection hologram elements. Each holographic element may filter the incoming wave front of light by color spectra using constructive interference in the Lippman/Bragg domain. Each holographic element may filter based on view point and/or depth by reconstructing a real image of a portion of the incoming wave front of light using constructive interference in the Fresnel domain.

To manufacture the holographic multiplexing element 200, each discrete volume hologram may be written to a holographic recording substrate (such as, for example, dichromated gelatin on optical glass) sequentially using an automated process than uses specific spectra of coherent light as an object wave and a reference wave to describe the mapping the aperture of each discrete holographic element to an input point in the incoming wave front and an output point on the image recording element.

The holographic multiplexing element 200 may additionally be implemented as a set of discrete relief transmission holograms that have a specific blazed coating applied. Each discrete holographic element may filter based on view point and depth by reconstructing a real image of a portion of the incoming wave front of light using constructive interference in the Fresnel domain. Each holographic element may filter the color spectra of the incoming wave front of light by constructive interference of the blazed coating. In the manufacture of this embodiment of the holographic multiplexing element 200, each discrete relief hologram may be written to a holographic recording substrate (such as, for example, a photo sensitive plastic applied to optical glass) sequentially using an automated process than uses specific spectra of coherent light as an object wave and a reference wave to describe the inverse mapping the aperture of each discrete holographic element to an input point in the incoming wave front and an output point on the image recording element. Each recording element is coated with a series of films through a mask to provide spectral filtering. The resulting holographic multiplexing element may be then mounted in a manner to use its conjugate (or psuedoscopic) reconstruction geometry. The above methods may also be used to manufacture a master holographic multiplexing element that is then replicated using methods known to those that are skilled in the art.

The Holographic Multiplexing Element may have data encoded in it that may be read by a processing module 102. For example, it is possible to encode, on an unused portion of the holographic multiplexing element, binary data using a known gray code to produce a pattern of lines or dots. In this manner, digital data may be associated with a specific holographic multiplexing element. The digital data may contain information of how the holographic multiplexing element maps the incoming wave front of light to portions of the one or more image recording elements. For example, the digital data may indicate that a first element of the holographic multiplexing element maps to a first image recording element at a particular location.

The characteristics of the holographic multiplexing element 200 may be changed to optimize the Imaging Device for a specific use. For instance, a holographic multiplexing element 200 may be manufactured that provides discrete elements that provide a large variety of spectral filters, and only a few spatial points and this would be useful for spectroscopy. Alternatively, the holographic multiplexing element 200 may be manufactured that encodes only red, green and blue spectral filters and a variety of spatial viewpoints arranged on the horizontal plane which would be useful for three dimensional imaging. In the example in FIG. 3B, the holographic multiplexing element 200 may be a single element, but the holographic multiplexing element 200 may also be implemented as one or more separate elements when combined together have the same effect as the single holographic multiplexing element 200.

Figure 5:
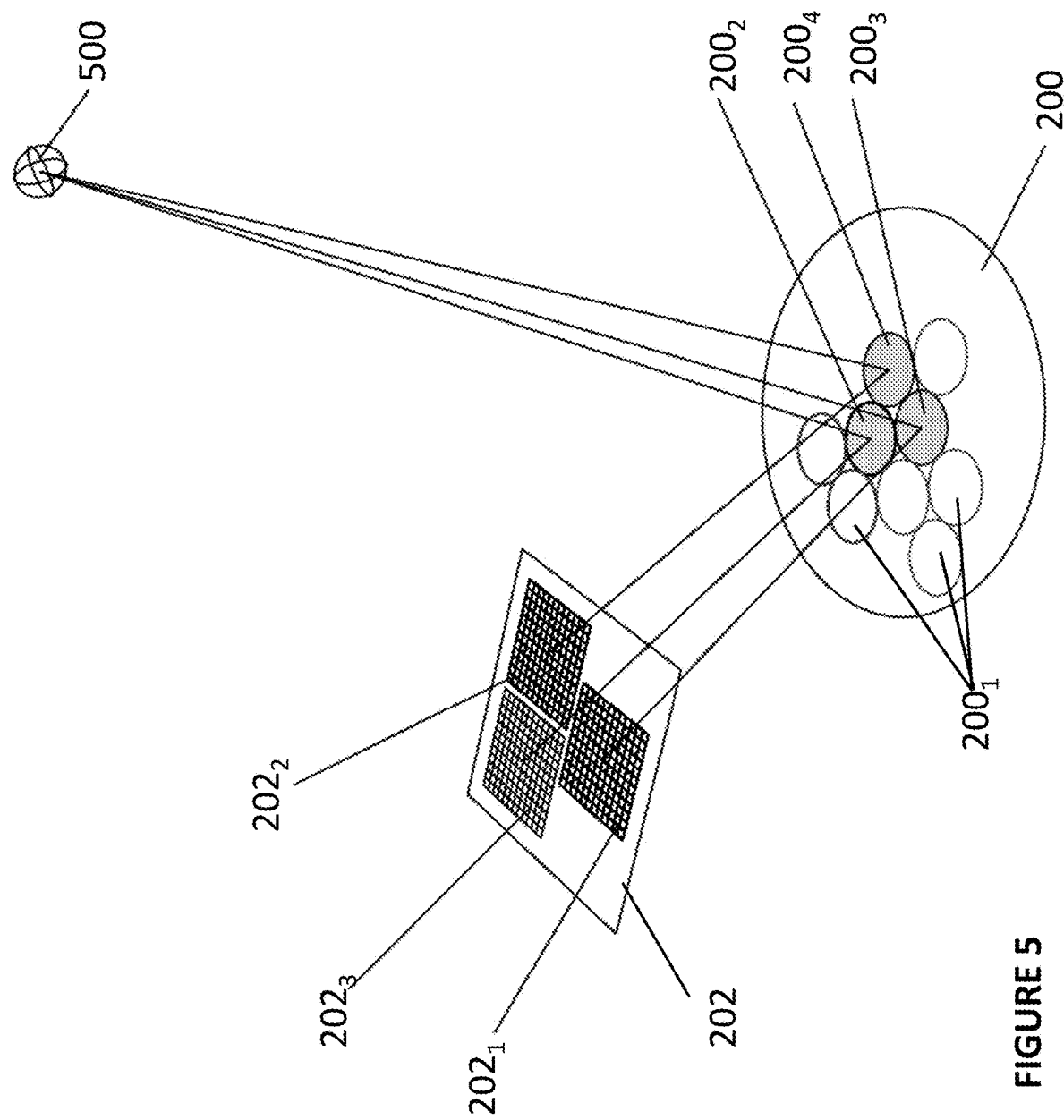
FIG. 5 illustrates an embodiment of the holographic multiplexer element for red/green/blue mapping.

FIG. 5 illustrates an embodiment of the holographic multiplexer element 200 and image recording element 202 for red/green/blue mapping. As shown in FIG. 5, the holographic multiplexer element 200 may have one or more holographic sub-elements $200_1$ and those holographic sub-elements $200_1$ may include a holographic element with red constructive filtering $200_2$ that reflect red wavelength electromagnetic radiation from an input spatial point 500, a holographic element with blue constructive filtering $200_3$ that reflect blue wavelength electromagnetic radiation from an input spatial point 500 and a holographic element with green constructive filtering $200_4$ that reflect green wavelength electromagnetic radiation from an input spatial point 500. As shown in FIG. 5, the red, green and blue wavelength electromagnetic radiation are reflected to the one or more image recording elements 202 (a single image recording element is shown in the example in FIG. 5, but the system is not limited to only the single image recording element.) In the embodiment in FIG. 5, the image recording element 202 may have one or more output sub-elements to which each of the holographic elements direct the different wavelengths of electromagnetic radiation. For example, the image recording element may have a recording element blue output $202_1$, a recording element green output $202_2$ and a recording element red output $202_3$. Thus, using this embodiment the red, green and blue wavelength electromagnetic radiation are mapped to different portions on the image recording element.

Figure 6:
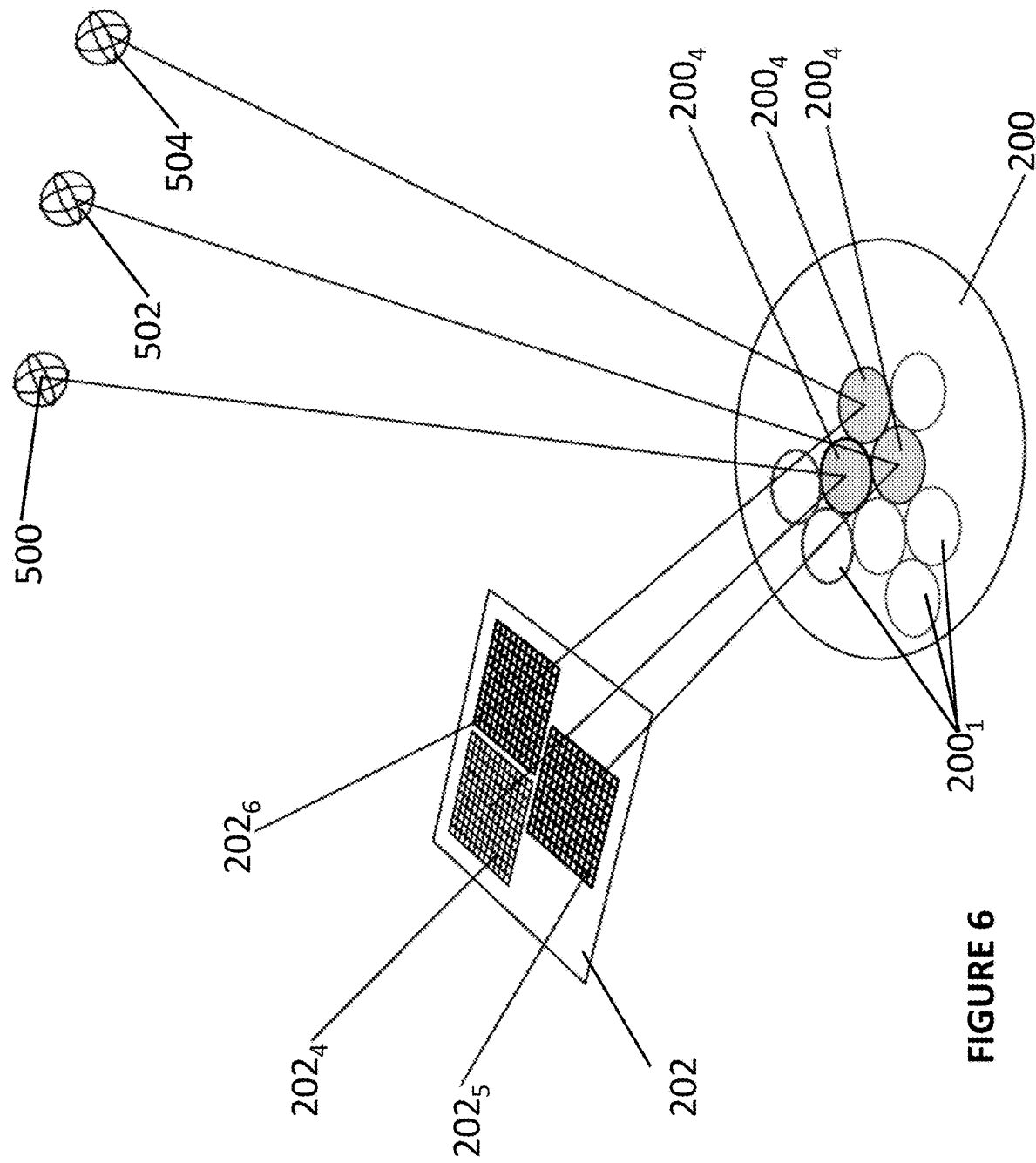
FIG. 6 illustrates an embodiment of the holographic multiplexer element for three dimensional mapping.

FIG. 6 illustrates an embodiment of the holographic multiplexer element 200 and image recording element 202 for three dimensional mapping. As shown in FIG. 6, the holographic multiplexer element 200 may have one or more holographic sub-elements $200_1$ and those holographic sub-elements $200_1$ may include one or more holographic elements with a particular wavelength of constructive filtering $200_4$, such as green in this example, that reflect electromagnetic radiation, such as green wavelength electromagnetic radiation in this example, from one or more input spatial points 500, 502, 504 so that three dimension mapping occurs due to the one or more input spatial points. As shown in FIG. 6, the single wavelength electromagnetic radiation, such as green in the example in FIG. 6, is reflected to the one or more image recording elements 202 (a single image recording element is shown in the example in FIG. 5, but the system is not limited to only the single image recording element.) In the embodiment in FIG. 6, the image recording element 202 may have one or more output sub-elements to which each of the holographic elements directs the electromagnetic radiation from the different input spatial points. For example, the image recording element may have a recording element spatial point one output $202_4$, a recording element spatial point two output $202_5$ and a recording element spatial point three output $202_6$. Thus, using this embodiment one wavelength of electromagnetic radiation is mapped, at three different input spatial points, to different portions on the image recording element to generate a three dimensional mapping.

B. Image Recording Elements 202

The holographic multiplexing element 200 multiplexes the input wave front of light onto the one or more image recording elements 202 that are positioned at predetermined locations on the support component 204, such as the positioning shown in FIG. 3B. Each image recording element may be an image recording device that can receive the electromagnetic radiation and store/convert the received electromagnetic radiation into electrical signals. In one implementation, each image recording device may be, but is not limited to, a CCD imaging device that has a moderate number of pixel elements that match an inexpensive high-yield production process. Since overall system resolution may be based on an aggregate of all of the image recording elements, the image recording devices may be chosen that have the best cost-per-pixel, rather than choosing high resolution devices. In addition, since the holographic multiplexing element is focusing light on each of the image recording elements from a very large aperture, low cost devices that have a smaller sensing area may be chosen. For example, a theoretical limit of the sensor size is 2× the wavelength that the sensor must record.

Each image recording element has a mechanism, such as a wire or cable, to transfer the electrical signals to the processing module 102.

C. Support Component 204

The support component 204 supports the holographic multiplexing element 200 and the one or more image recording elements 202 and matches the off-axis multiplexing relationship between the holographic multiplexing element 200 and the one or more image recording elements 202. Specifically, as shown in FIG. 3B, if there is an axis perpendicular to the holographic multiplexing element 200, the one or more image recording elements 202 are off-axis. The support component may be made of a material, such as plastic or metal, so that it maintains the geometric relationship within design tolerances over the range of temperature and humidity required. Alternatively, the support component 204 may be a carbon fiber composite instead of aluminum so that a camera with a large aperture may remain calibrated (provide a sharp and true image) over a wide range of temperatures. An example of the geometric relationship between the holographic multiplexing element 200 and the one or more image recording elements 202 is shown in FIG. 3B, but other geometric relationships may also be used.

D. Light Ways 206

Figure 3C:
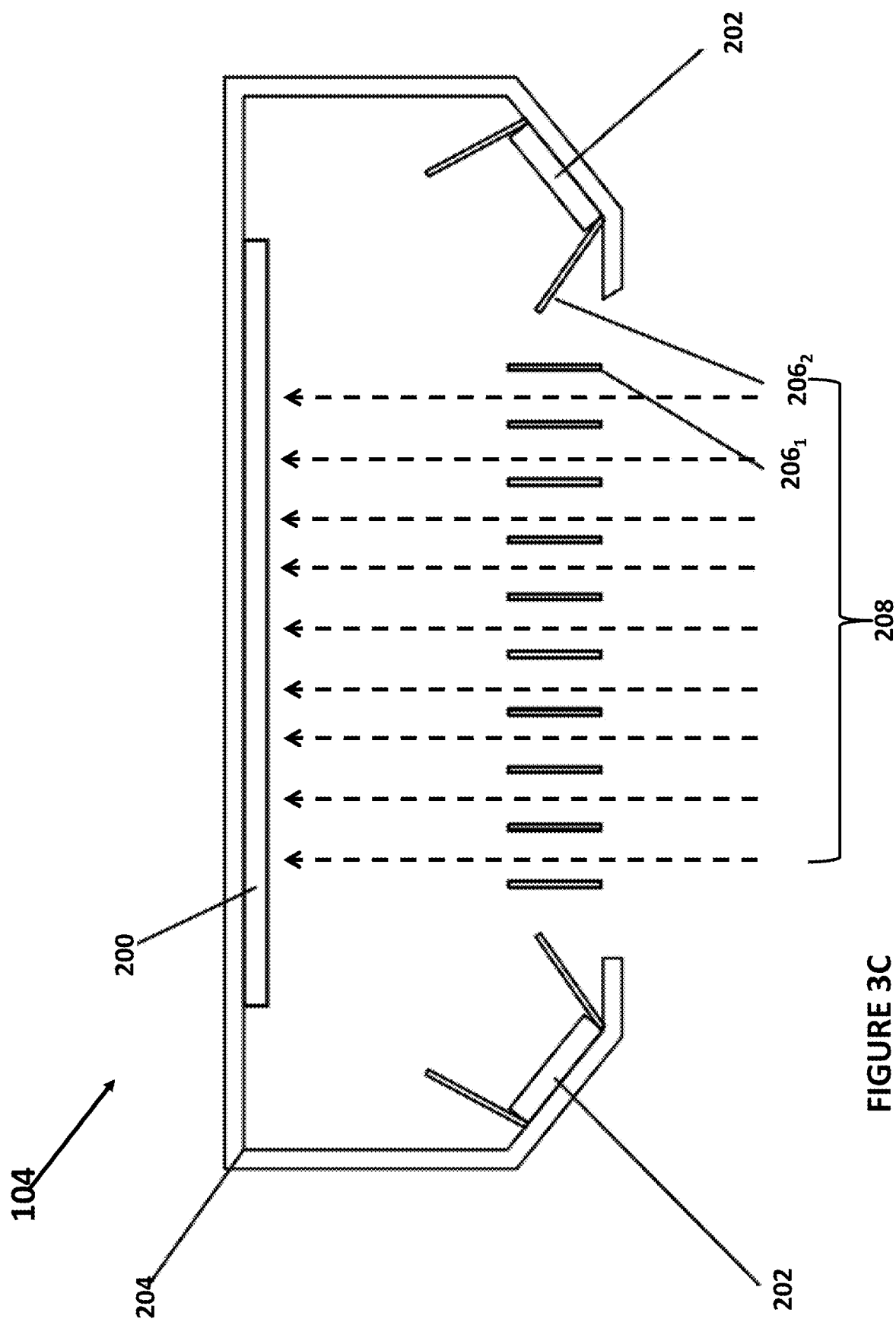
Figure 3D:
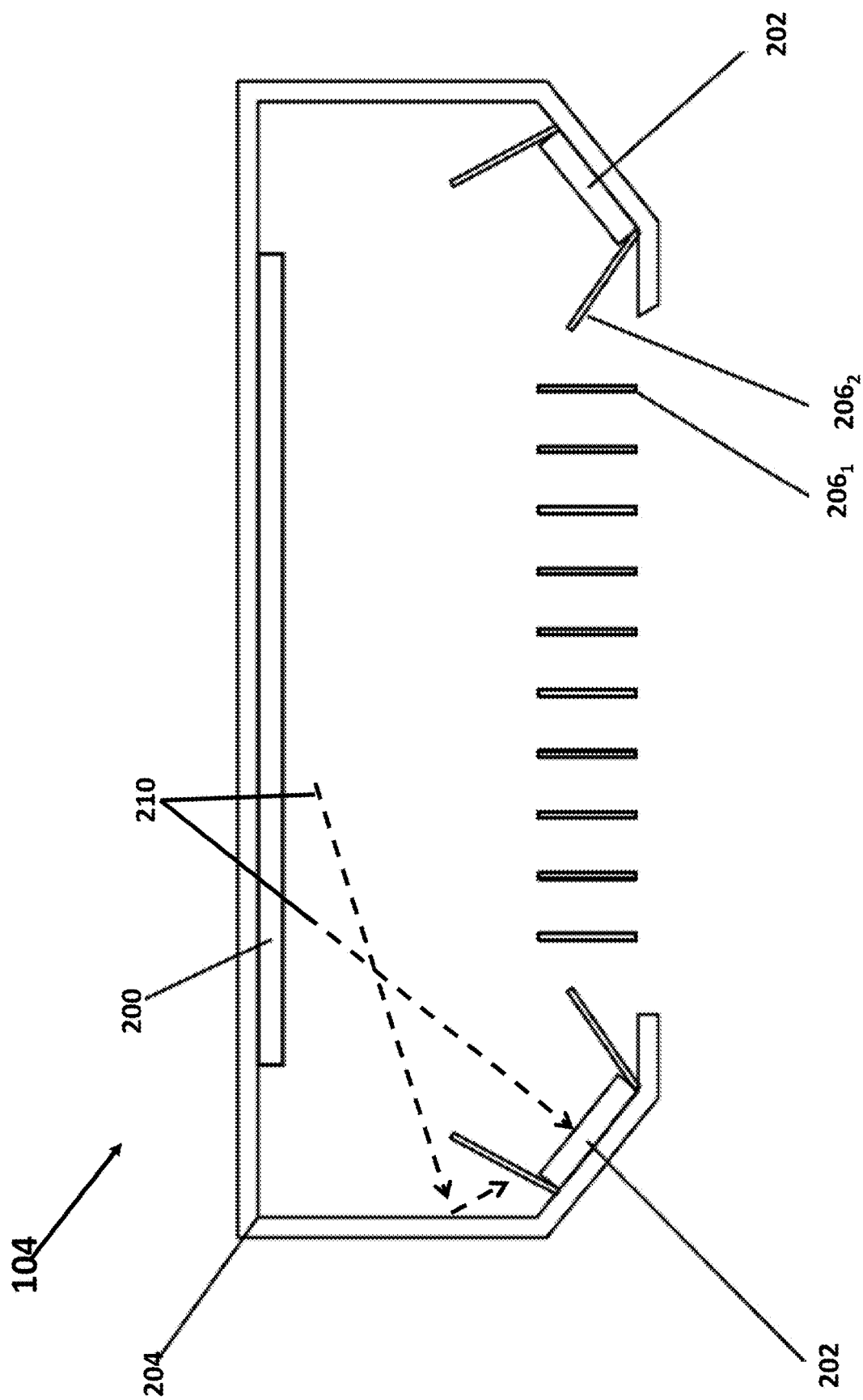

The light ways 206 may each be a piece of material, such as plastic or metal with certain properties to suppress ambient or reflected electromagnetic energy, that is connected to the support component 204, such as in the configuration shown in FIG. 3B. Other configurations of the light ways 206 may also be used. A first set of light ways $206_1$ may be positioned at an input of the hybrid integral imaging unit 104 to allow a signal wave front of light 208 (examples of which are shown in FIG. 3C with dotted lines) to strike the holographic multiplexing element 200. A second set of light ways $206_2$, such as two for each image recording element 202 in one implementation, allow a set of multiplexed light components 210 (examples of which are shown in FIG. 3D with dotted lines) to strike the image recording elements 202. Both of the sets of light ways 206 suppress all other ambient and reflected light.

For simple mapping geometries, a light way may be constructed using a honeycomb shape, where the proportion of the width to depth of a honeycomb element is chosen to match the camera angle of view, and the width of the honeycomb is chosen as a proportion to the thickness of the honeycomb wall to optimize throughput of the electromagnetic radiation wave front and the reduction of shadows or artifacts from the light ways. For more complex light ways, the path of each input and output ray for a given discrete holographic sub-element may be laser cut into a lightweight, rigid foam block.

E. Processing Module 102

Figure 4A:
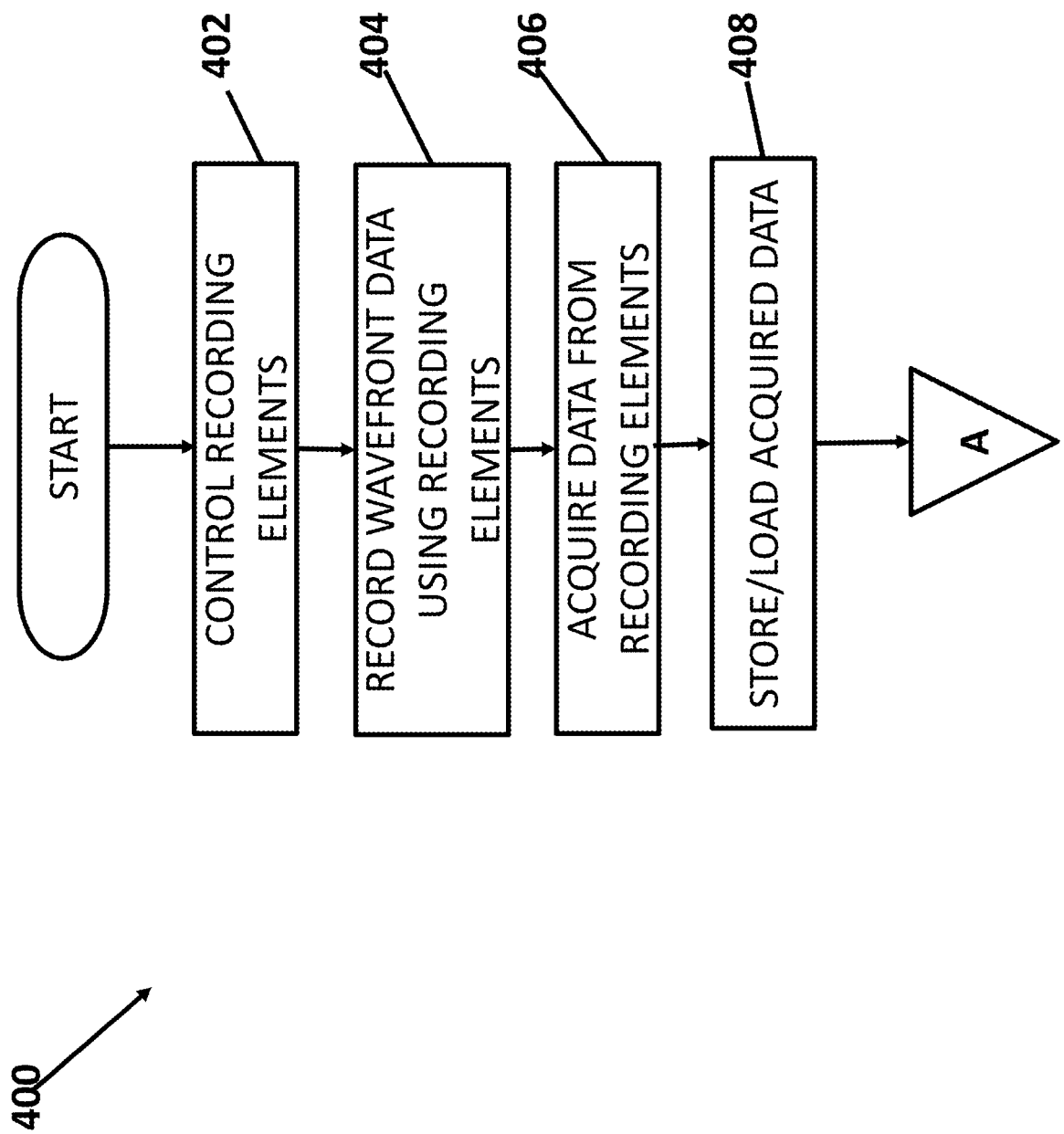
FIGS. 4A and 4B illustrates a method for hybrid integral imaging.
Figure 4B:
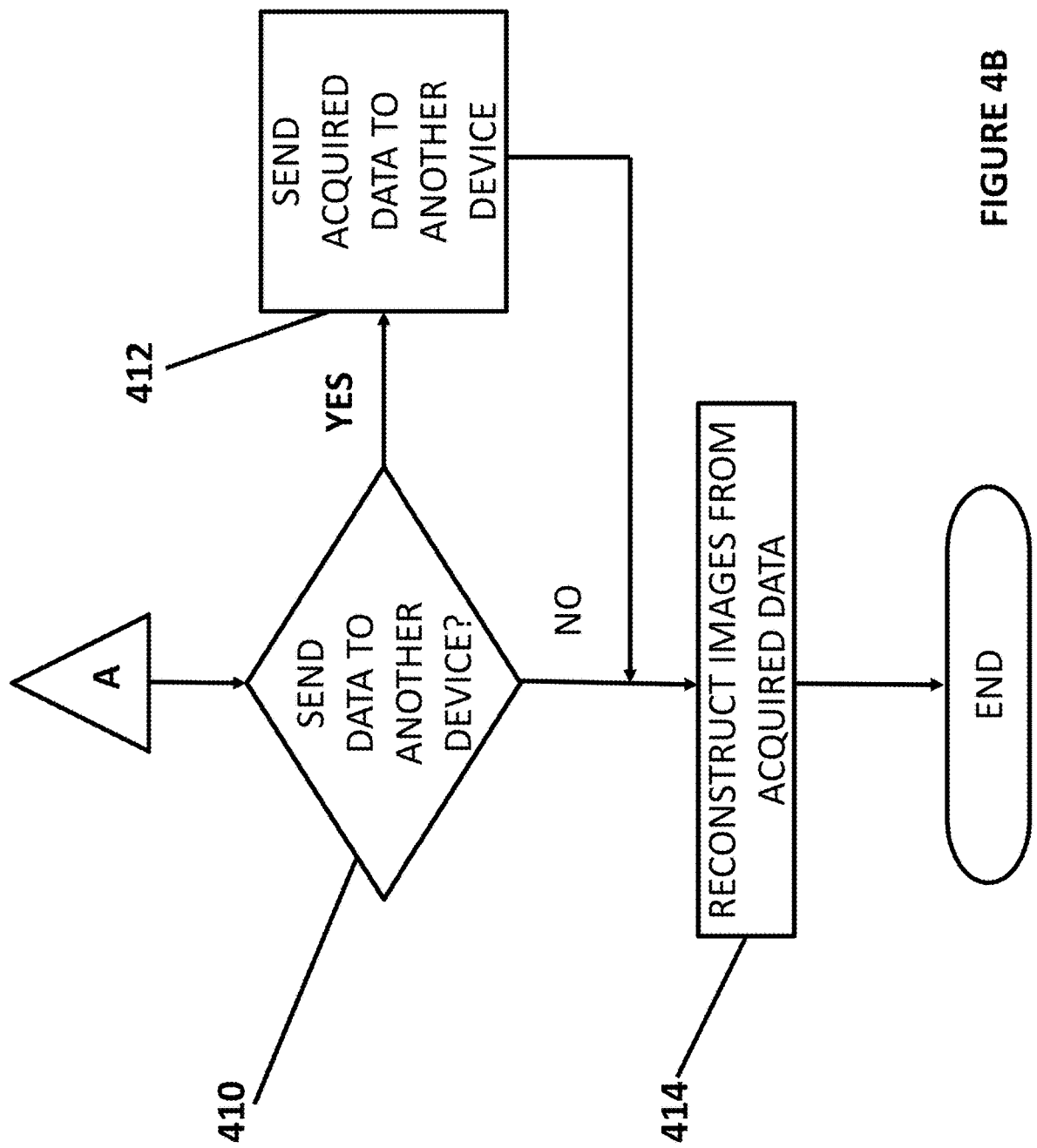

The processing module 102 may be a processing unit or a processing unit based device (such as shown in FIGS. 1 and 2) that may execute a piece of software (or a plurality of lines of computer code) to perform various processes associated with the hybrid integral imaging unit. A method for hybrid integral imaging 400 using those processes are disclosed in more detail in FIGS. 4A and 4B. The processes receive the data from each of the image recording elements that are reflected off of the holographic multiplexing element and maps that data to the input wave front of light. The processing module may thus control the image recording elements (402.) During the control of the one or more image recording element, the processing module may read the data encoded within the holographic multiplexing element that, among other data, contains data about how the particular holographic multiplexing element has been configured so that the processing module is able to process the data from the one or more image recording element, map the data to and reconstruct an input wave front of light. During the control, the processing module may also start and/or stop a recording for a specific time so that the one or more image recording elements record the wave front data (404.)

The processing module may then acquire the data from the image recording elements (406) using specific methods and attributes. For example, the image data may be acquired from several optical elements containing similar viewpoints, and using multiple processing elements mapped to portions of the image recording elements, combine these viewpoints to comprise a sharper, higher resolution image data. In addition, input image data from a variety of view may be analyzed, and converted into a three dimensional representation such as a Binary Space Partition or Octree, representing component watersheds of the wave front. The image data may also be compressed, using known methods such as entropy encoding based on differences in one or more spatial or color spaces.

The processing module may then store the acquired data from the image recording elements and/or load already stored data from the image recording elements (408.) The processing module (such as the computer system in FIG. 2 described above) may have the interface and circuits 106f so that the processing module can communicate the acquired the image recording element data to another device over a network. Thus, the processing module determines whether or not to send the image recording data to another device (410) and then is able to send the data (412.) Then, the processing module (or the other device that has similar resources) may reconstruct the acquired data into images with specific methods and attributes (414.)

During the reconstruction process, for example, the processing module may use multiple processors to decode information stored in a 3d form, and transform the input data to represent a given point of view, synthetic aperture, or color space. The processing module may also construct an image by directly assembling images from a specific point of view encoded in the holographic multiplexing element, and mapped to the image recording element in a manner that is easily tiled and reconstructed. The processing module may then refine the image such a reconstructed image using edges or high frequencies found in similar or adjacent views.

The processing module (or the other device) may also adjust its reconstruction process based on configuration options from the user interface component or from another device over a network.

F. User Interface Component/Module

Figure 7B:
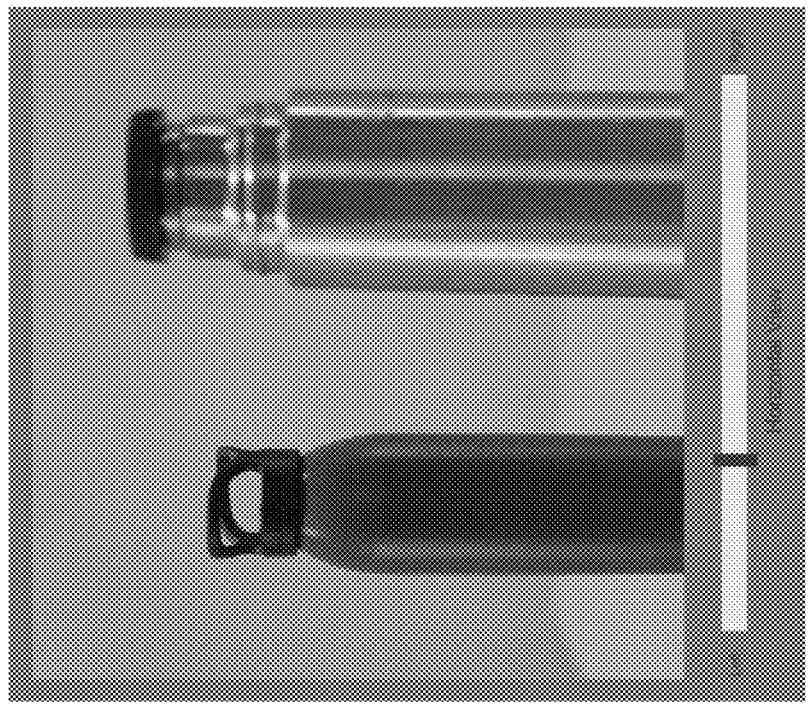
FIGS. 7A, 7B, 8A and 8B illustrate examples of the user interface used to adjust the depth of view or field of view of the system.
Figure 7A:
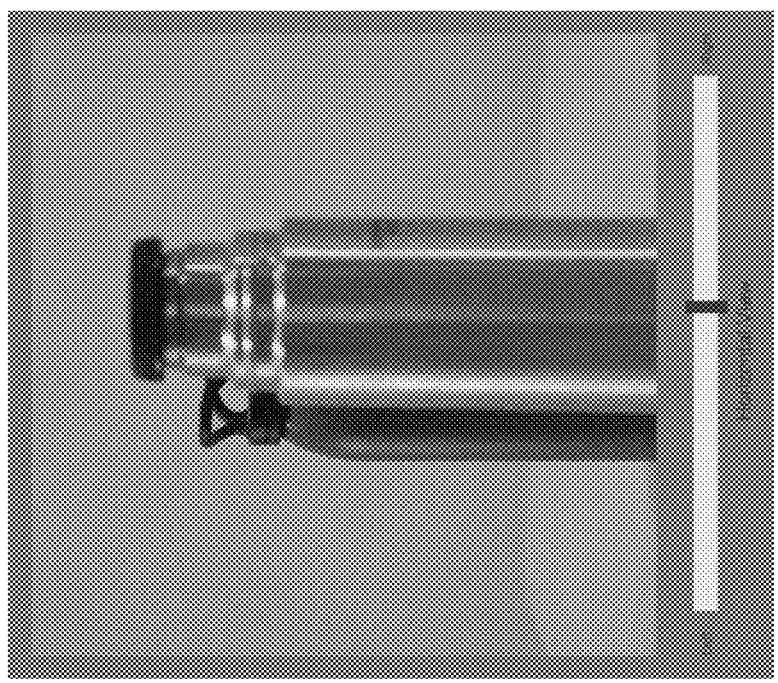
Figure 8B:
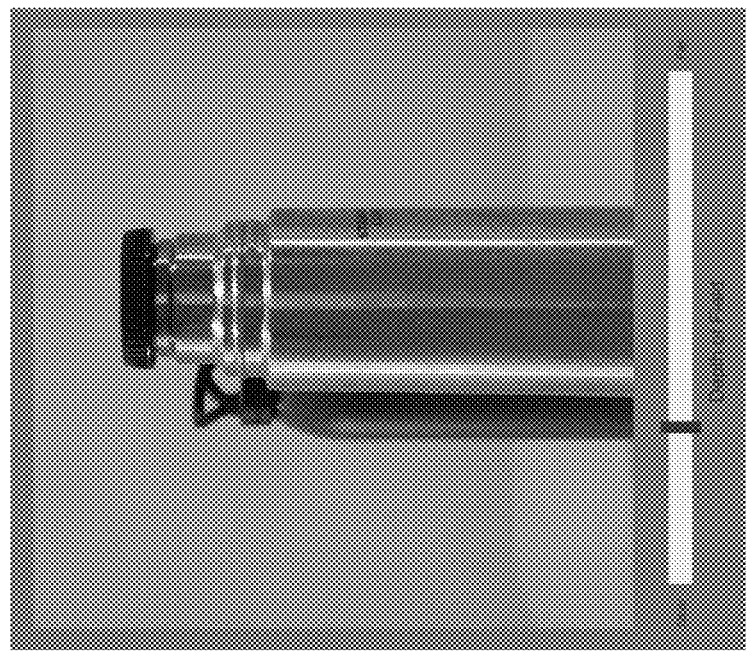
Figure 8A:
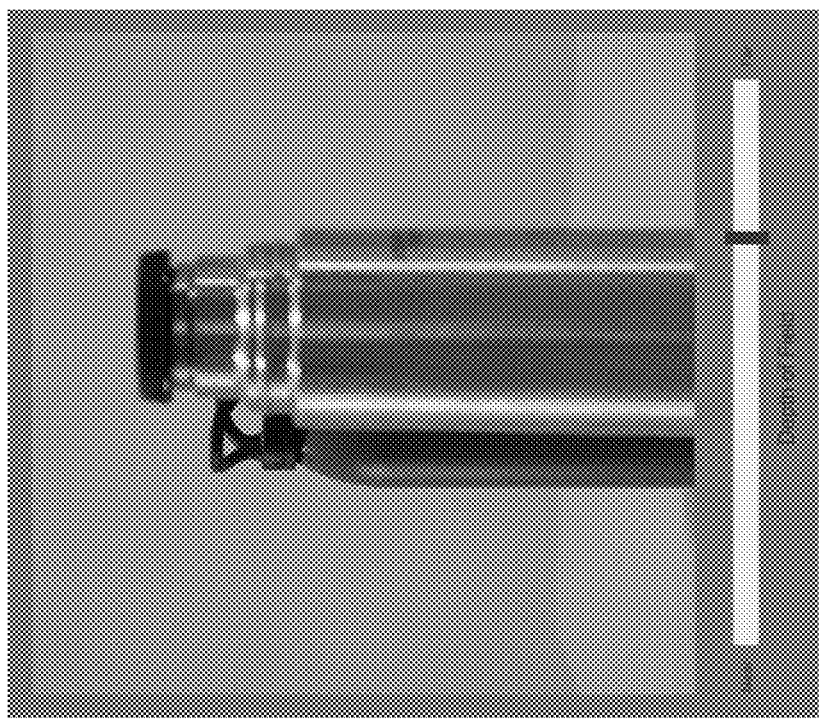

The User Interface component has device/mechanism/process for a user to set attributes and methods and communicate them to the processing module 102. For instance, one attribute may be a specific method of how the processing Module will acquire data from the Recording Elements. Additionally, one of these attributes may be when the processing module starts and/or stops recording of the wave front of light from the image recording elements. The attributes may also, for instance, include a method to display a reconstruction of the acquired data as an image. Additionally, one of the attributes that are set by the user and communicated to the processing module may be what point of view to reconstruct, at what depth. FIGS. 7A and 7B show a change of view left and change of view right selection by the user from the user interface while FIGS. 8A and 8B illustrates a depth of field far and a depth of field near selection by the user from the user interface.

G. Enclosure

The enclosure holds all of the other system components in a manner that protects them from light, dust and/or physical damage. It does this in a way that is pleasing for a user to hold, to touch and to see. The enclosure may be made of a carbon composite material which may be rigid and light and may be cast with a texture on the surface that may be decorative and may provide an easy to hold surface.

H. Implementation of the Hybrid Integral Imaging Geometry

The hybrid integral imaging geometry may be designed to maximize the efficiency of the holographic multiplexing element in the Lippman-Bragg regime while reducing internal reflections from the various system elements. One example of a configuration is to place the Holographic Multiplexing Element plane to the incoming wave front of light at the back of the device, and to place the Recording Elements off axis under the device aperture as shown in FIGS. 3A-3D. The hybrid integral imaging system may use other geometries and the disclosure is not limited to the geometry shown in FIGS. 3A-3D.

The Holographic Multiplexing Element may be removed and replaced from the device as needed. Once the hybrid integral imaging geometry is determined, the geometry between the Holographic Multiplexing Element and the image recording elements remains fixed. However, the form of multiplexing may be changed, with a replacement of the holographic multiplexing element. For instance, if the Hybrid Integral Imaging System had 64 Image Recording Elements of 3200×2400, possible multiplexing configurations (requiring a holographic multiplexing element change) could be:

1. 530 (640×480) points of view at 3 colors with an aggregate 491 Mega Pixels.
2. 2130 (320×240) points of view at 3 colors.
3. 16 (3200×2400) points of view, 12 depths, Monochrome.

4. 1 (3200×2400) view. 8 depths, 8 color samples for full spectrum imaging.

In the above examples, a same number of image recording element pixels (or sensing areas) are used for each configuration and the change needed to change from a large aperture 3d light field camera represented by example (2) and a high resolution spectral depth imaging camera represented by example (4) is the holographic multiplexing element 200. In the case of example (2) the holographic multiplexing element 200 may be manufactured to map many input wave front spatial points into small sections of the image recording element. In the case of example [4], more frequency filtering, and fewer input spatial points are used to map the input wave front of light to large areas of image recording element. An example of the geometry of an implementation of the system is shown in FIGS. 3A-3D.

The hybrid integral imaging system receives a wave front of light and uses the constructive interference of light, distributes the wave front of light into a multiplicity of amplitude images (by the holographic multiplexing element) focused onto the one or more image recording elements. In the system, each focused image recording element is distributed by wavelength, position of view, and/or depth of focus.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A hybrid integral imaging apparatus, comprising:
a support component;
a holographic multiplexing element having a set of discrete relief transmission holograms having a blazed coating that reflect and filter a wave front of electromagnetic radiation by a frequency and a spatial location, the set of discrete relief transmission holograms having a plurality of holographic sub-elements wherein each holographic sub-element reflects a different wavelength of electromagnetic radiation from a different input spatial point using constructive interference of the blazed coating;
one or more image recording elements that each receive the reflected wave front of electromagnetic radiation from the holographic multiplexing element and generates a set of electrical signals that represent the reflected wave front; and
a processing module that receives the set of electrical signals that represent the reflected wave front from each image recording element and reconstructs the set of electrical signals that represent the reflected wave front from each image recording element into a reconstructed image having one of a point of view and a depth.

2. The apparatus of claim 1, wherein the holographic multiplexing element further comprises a volume reflection hologram recorded in a Lipmann-Bragg regime.

3. The apparatus of claim 1, wherein the recorded hologram further comprises a set of recorded interference fringes slicing through a volume of a recording medium at ½ wavelength layers.

4. The apparatus of claim 1, wherein the holographic multiplexing element further comprises a plurality of discrete holographic optical portions.

5. The apparatus of claim 1, wherein the holographic multiplexing element further comprises a plurality of virtual off-axis concave reflector sub-elements that each focus a narrow wavelength of electromagnetic radiation.

6. The apparatus of claim 5, wherein each reflector sub-element further comprises one of a parabolic reflector sub-element and a spheroid reflector sub-element.

7. The apparatus of claim 6, wherein each reflector sub-element is a mirror sub-element.

8. The apparatus of claim 5, wherein each virtual off-axis concave reflector sub-element focuses an image of a particular frequency band from a specific point of view with a specific virtual aperture and at a specific depth of field to a particular image recording element.

9. The apparatus of claim 1, wherein the support component maintains a fixed geometry between the holographic multiplexing element and the one or more image recording elements.

10. The apparatus of claim 9, wherein the holographic multiplexing element is positioned with a long axis perpendicular to incoming electromagnetic radiation and the one or more image recording elements are positioned off-axis from the incoming electromagnetic radiation.

11. The apparatus of claim 1 further comprising one or more light ways that suppress ambient electromagnetic radiation and reflected electromagnetic radiation.

12. The apparatus of claim 11, wherein the one or more light ways further comprises a first set of light ways that direct incoming electromagnetic radiation towards the holographic multiplexing element.

13. The apparatus of claim 11, wherein the one or more light ways further comprises a second set of light ways at each image recording element that suppress reflected electromagnetic radiation.

14. The apparatus of claim 1, wherein the electromagnetic radiation is one of light and near visible light.

15. The apparatus of claim 14, wherein the electromagnetic radiation are line spectra that fall within a Visible and a Near IR region of the electromagnetic spectrum.

16. The apparatus of claim 1, wherein each image recording element is a charge coupled device.

17. The apparatus of claim 1 further comprising an enclosure that encloses the support component, the holographic multiplexing element and the one or more image recording elements.

18. The apparatus of claim 17, wherein the processing module is within the enclosure.

19. The apparatus of claim 1, wherein the processing module is a computer system.

20. A hybrid integral imaging method, comprising:
controlling one or more image recording elements to receive a reflected wave front of electromagnetic radiation from a holographic multiplexing element having a set of discrete relief transmission holograms having a blazed coating in order to generate a set of electrical signals that represent the reflected wave front at each image recording element, wherein controlling the one or more image recording elements further comprising reflecting, by each discrete relief transmission hologram in the holographic multiplexing element, a different wavelength of electromagnetic radiation from a different input spatial point using constructive interference of the blazed coating;
acquiring, by a processing module, the set of electrical signals that represent the reflected wave front from each image recording element; and reconstructing the set of electrical signals that represent the reflected wave front from each image recording element into a reconstructed image having one of a point of view and a depth.

21. The method of claim 20, wherein reconstructing the set of electrical signals further comprises reconstructing the set of electrical signals on the processing module.

22. The method of claim 20 further comprising storing the set of electrical signals that represent the reflected wave front from each image recording element.

23. The method of claim 20, wherein acquiring the set of electrical signals further comprises loading the set of electrical signals that represent the reflected wave front from each image recording element from a storage medium.

24. The method of claim 20 further comprising sending the set of electrical signals that represent the reflected wave front from each image recording element to a second device.

25. The method of claim 24, wherein reconstructing the set of electrical signals further comprises reconstructing the set of electrical signals at the second device.

* * * * *